(12) United States Patent
Takahashi et al.

(10) Patent No.: US 11,312,418 B2
(45) Date of Patent: Apr. 26, 2022

(54) SUBFRAME STRUCTURE

(71) Applicant: HONDA MOTOR CO., LTD., Tokyo (JP)

(72) Inventors: Hayato Takahashi, Wako (JP); Takuto Sakai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 263 days.

(21) Appl. No.: 16/833,929

(22) Filed: Mar. 30, 2020

(65) Prior Publication Data

US 2020/0307700 A1    Oct. 1, 2020

(30) Foreign Application Priority Data

Mar. 29, 2019   (JP) .............................. JP2019-065307

(51) Int. Cl.
*B62D 21/11* (2006.01)

(52) U.S. Cl.
CPC ................... *B62D 21/11* (2013.01)

(58) Field of Classification Search
CPC ...... B62D 21/155; B62D 25/08; B62D 21/11; B60R 19/34
See application file for complete search history.

(56) References Cited

U.S. PATENT DOCUMENTS

| 3,544,128 A * | 12/1970 | Nelson ................... B62D 53/04 280/81.6 |
| 2014/0110925 A1* | 4/2014 | Goellner .............. B62D 21/155 280/781 |
| 2016/0236718 A1* | 8/2016 | Tatsuwaki ............... B60R 19/34 |

FOREIGN PATENT DOCUMENTS

| JP | S59-70206 A |   | 4/1984 |   |
| JP | 2000006835 A | * | 1/2000 |   |
| JP | 2012166739 A | * | 9/2012 |   |
| JP | 5870680 B2 | * | 3/2016 |   |
| WO | WO-2015133050 A1 | * | 9/2015 | ............. B62D 21/11 |

* cited by examiner

*Primary Examiner* — Lori L Lyjak
(74) *Attorney, Agent, or Firm* — Rankin, Hill & Clark LLP

(57) ABSTRACT

A subframe arranged below a power plant room located in a forward part of a vehicle includes: a left-right pair of extension members extending in a vehicle front-rear direction; a rear member connected to rear end portions of the extension members and extending in a vehicle width direction; and U-shaped brackets respectively attached to front portions of the extension members and each extending downward and inclined forward in side view. The extension members each have left and right side faces spaced apart in the vehicle width direction. Each of the U-shaped brackets is made from a flat plate and includes a left-right pair of connection portions respectively connected to the left and right side faces of the corresponding one of the extension members. Each of the U-shaped brackets has a bottom face portion having a sloped surface that rises upward as the sloped surface extends forward.

6 Claims, 4 Drawing Sheets

SUBFRAME STRUCTURE

CROSS-REFERENCE TO RELATED APPLICATIONS

The present application claims priority under 35 U.S.C. § 119 to Japanese Patent Application No. 2019-065307, filed Mar. 29, 2019, the disclosure of which is herein incorporated by reference in its entirety.

BACKGROUND OF THE INVENTION

1. Field of the Invention

The present invention relates to a structure of a subframe arranged below a power plant room located in a forward part of a vehicle.

2. Description of Related Art

For example, Japanese Patent Application Laid Open No. S59-70206 discloses a structure in which a substantially U-shaped towing hook is attached to a subframe (engine mount member). According to the structure disclosed in Japanese Patent Application Laid Open No. S59-70206, the towing hook is arranged along a side member of the subframe in a longitudinal direction of the side frame and connected to an upper face thereof. This towing hook has a lower end projected downward to facilitate engaging and disengaging with an engagement hook of a towing rope.

SUMMARY OF THE INVENTION

According to the structure disclosed in Japanese Patent Application Laid Open No. S59-70206, the towing hook is connected to the upper face of the subframe. With this structure, for example when the vehicle body comes into contact with an obstacle like a curb or with a steep sloped road when moving over them, the subframe could be deformed due to a load applied to the towing hook.

The present invention has been made in view of the above-described circumstances, and an object of the present invention is to provide a subframe structure that is capable of preventing the deformation of a subframe and preventing the deformation of a power plant installed in a power plant room even when a load is applied to such a U-shaped bracket.

To achieve the above-described object, provided is a subframe structure of a subframe arranged below a power plant room located in a forward part of a vehicle, the subframe including: a left-right pair of extension members extending in a vehicle front-rear direction and each having a rear end portion; a rear member connected to the rear end portions of the pair of left-right extension members and extending in a vehicle width direction; and U-shaped brackets each of which is disposed at a front portion of a corresponding one of the left-right pair of extension members, the U-shaped brackets each extending downward and inclined forward in the vehicle front-rear direction in side view. Each of the left-right pair of extension members has left and right side faces spaced apart in the vehicle width direction. Each of the U-shaped brackets is made from a flat plate and includes a left-right pair of connection portions respectively connected to the left and right side faces of the corresponding one of the left-right pair of extension members. Each of the U-shaped brackets has a bottom face portion having a sloped surface that rises upward as the sloped surface extends forward in the vehicle front-rear direction.

The present invention provides a subframe structure that is capable of preventing the deformation of a subframe and preventing the deformation of a power plant installed in a power plant room even when a load is applied to a U-shaped bracket.

DETAILED DESCRIPTION OF THE EMBODIMENTS

Figure 1:
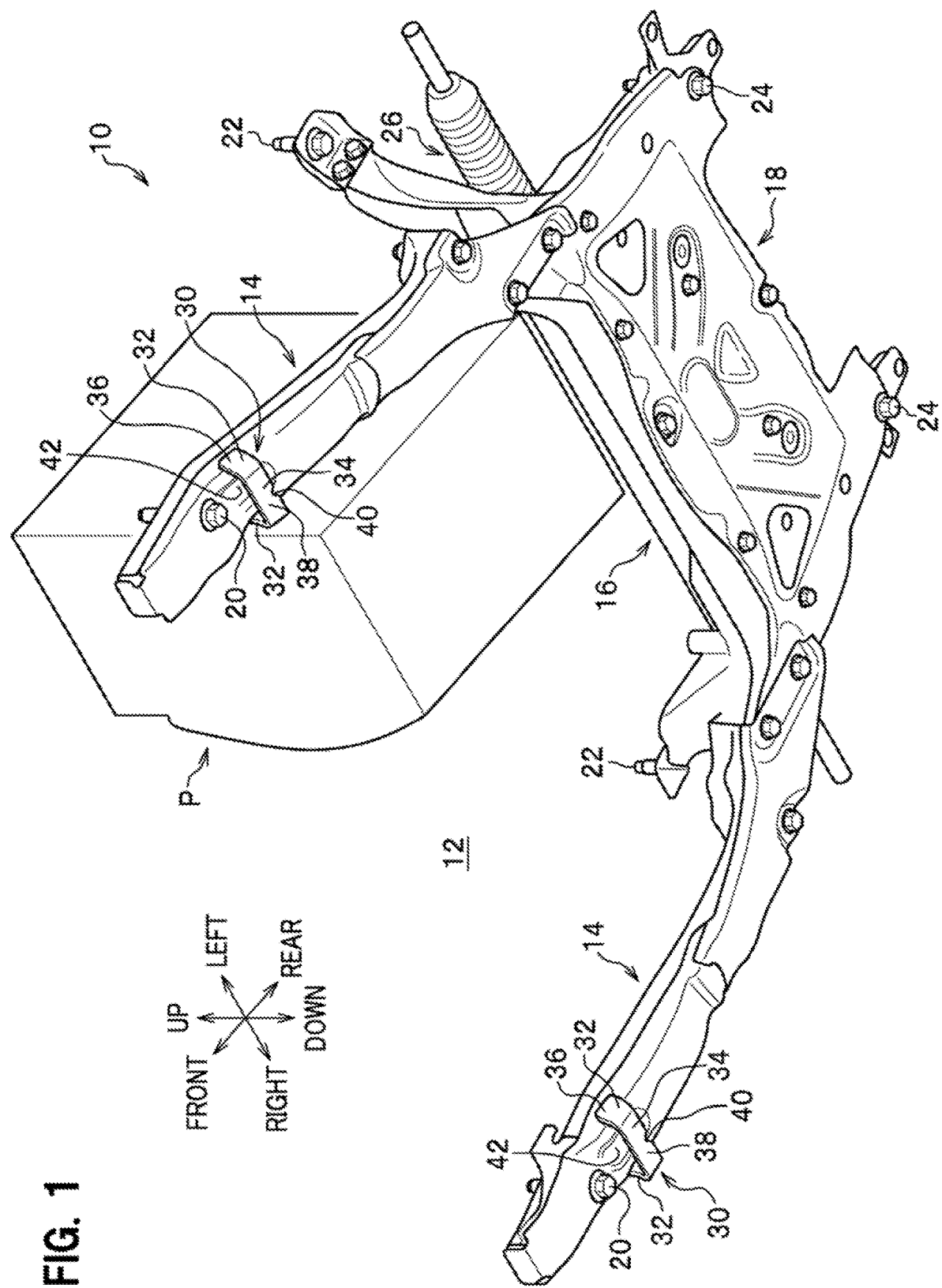
FIG. 1 is a perspective view of a front subframe to which a subframe structure according to an embodiment of the present invention is applied, as seen from a lower position ahead of the vehicle.

Next, an embodiment of the present invention will be described in detail with reference to the drawings.

In the drawings, "front-rear", "left-right", and "up-down" directions correspond to the vehicle front-rear direction, left-right direction (vehicle width direction), and vehicle up-down direction (vertically upward-downward direction), respectively.

A front subframe 10 (hereinafter referred to simply as subframe 10) to which a subframe structure according to the embodiment of the present invention is applied is to be arranged in a forward part of a vehicle. As shown in FIG. 1, the subframe 10 is arranged below a power plant room 12 located in the forward part of the vehicle.

The subframe 10 supports front-wheel suspension devices not shown and supports the power plant P, e.g., a drive unit including a motor and/or an engine, via a mount mechanism not shown.

As shown in FIG. 1, the subframe 10 has a left-right pair of extension members 14, a rear member 16, and a reinforcement member 18. Each of the left-right pair of extension members 14 has a forward part to which a U-shaped bracket 30 serving as a towing hook is attached.

The subframe 10 includes a plurality of vehicle body connection parts to be respectively connected to a plurality of vehicle-body-side members using bolts and nuts. The plurality of vehicle body connection parts are constituted by a left-right pair of front vehicle body connection parts 20, a left-right pair of mid vehicle body connection parts 22, and a left-right pair of rear vehicle body connection parts 24.

The left-right pair of front vehicle body connection parts 20 connect a forward part of the subframe 10 to a front bulkhead not shown. The left-right pair of mid vehicle body connection parts 22 connect a vehicle front-rear direction central part of the subframe 10 to front side frames not shown. The left-right pair of rear vehicle body connection parts 24 connect a rearward part of the subframe 10 to, for example, outriggers not shown.

The left-right pair of extension members 14 extends substantially in the vehicle front-rear direction such that a distance between them slightly increases as they extend forward in the vehicle front-rear direction, in plan view. Each of the left-right pair of extension members 14 has a closed cross section having a rectangular shape in a cross section taken along a plane perpendicular to an axial direction of the extension member 14. The left-right pair of extension members 14 are formed of a steel material, for example.

The rear member 16 is located rearward of the left-right pair of extension members 14 and extends in the vehicle width direction. The rear member 16 has an upper face on which an electric power steering device 26 or the like is mounted. The rear member 16 is formed of a light metal such as aluminum or an aluminum alloy. The rear member 16 has a lower face to which the reinforcement member 18 is connected via a plurality of connection points. The reinforcement member 18 reinforces the rear member 16 formed of the light metal.

Figure 2:
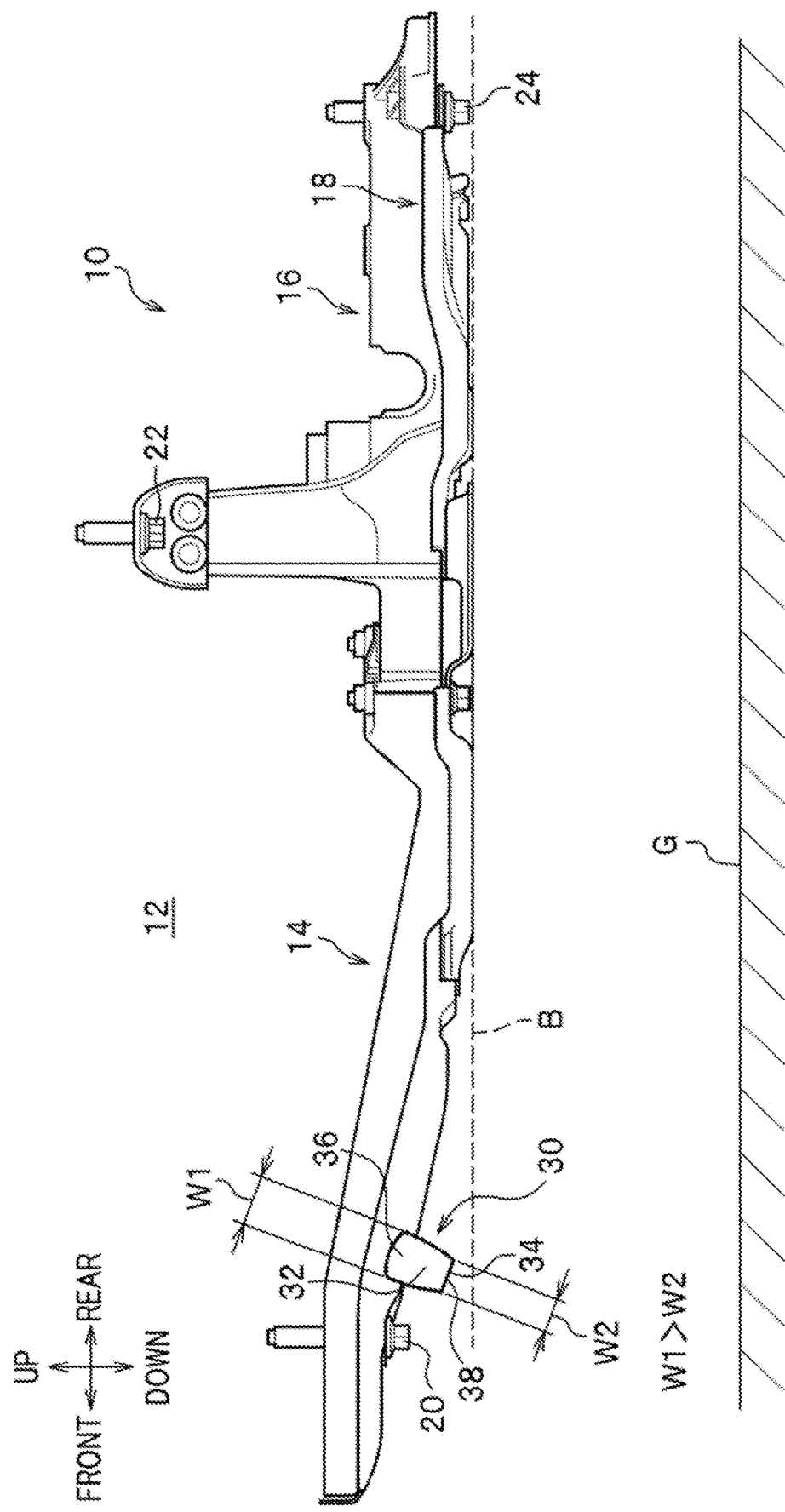
FIG. 2 is a left side view of the front subframe shown in FIG. 1.
Figure 3:
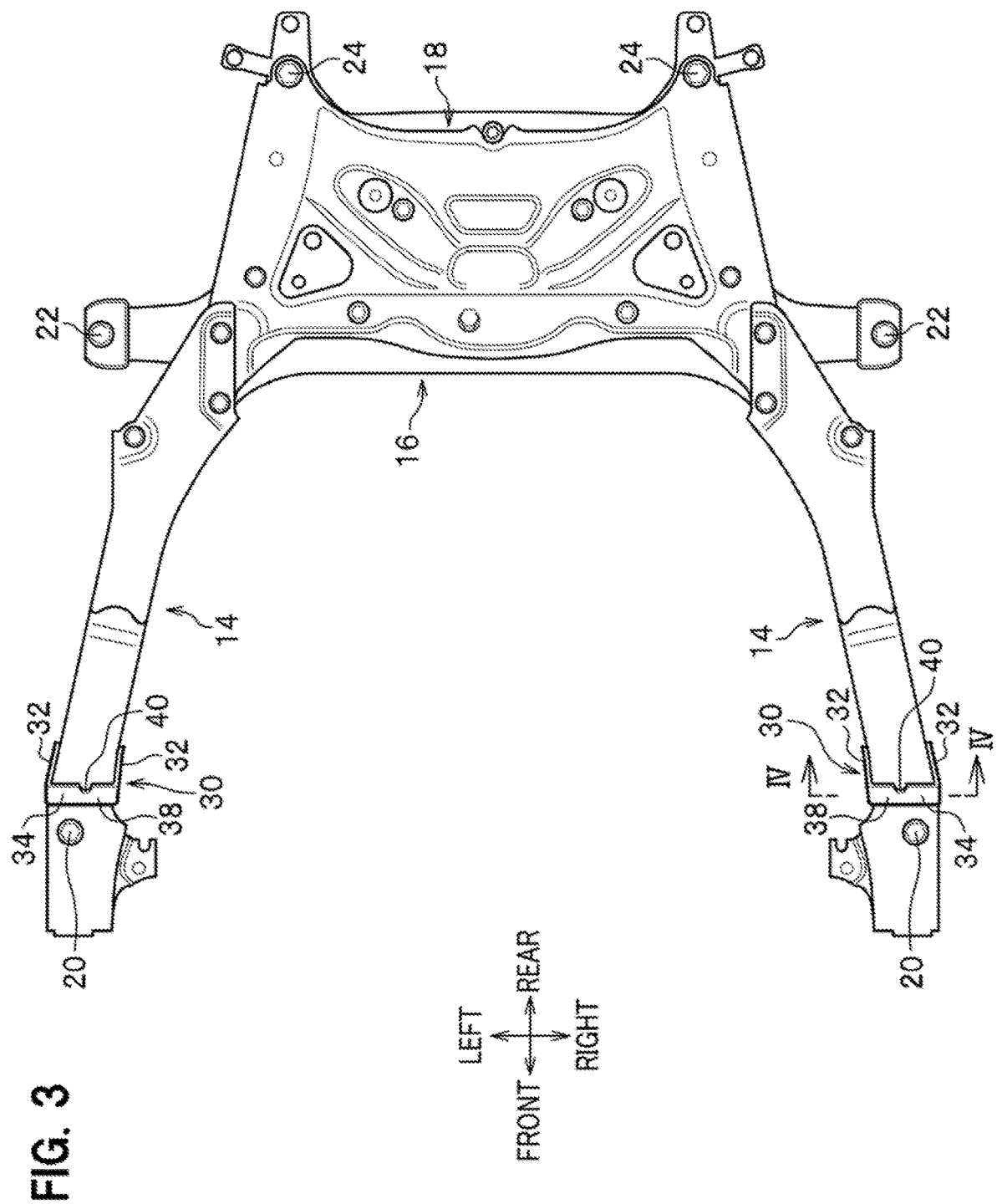
FIG. 3 is a bottom view of the front subframe shown in FIG. 1.

As shown in FIG. 2, each U-shaped bracket 30, extending downward and inclined forward in the vehicle front-rear direction in side view as seen from a lateral direction, is attached to a forward part of the corresponding extension member 14. Each U-shaped bracket 30 is of a substantially U-shape (see FIG. 4) as seen from the front or the rear of the vehicle and is made from a flat plate. The U-shaped brackets 30 are respectively attached to the left-right pair of extension members 14 (see FIGS. 1 and 3).

Figure 4:
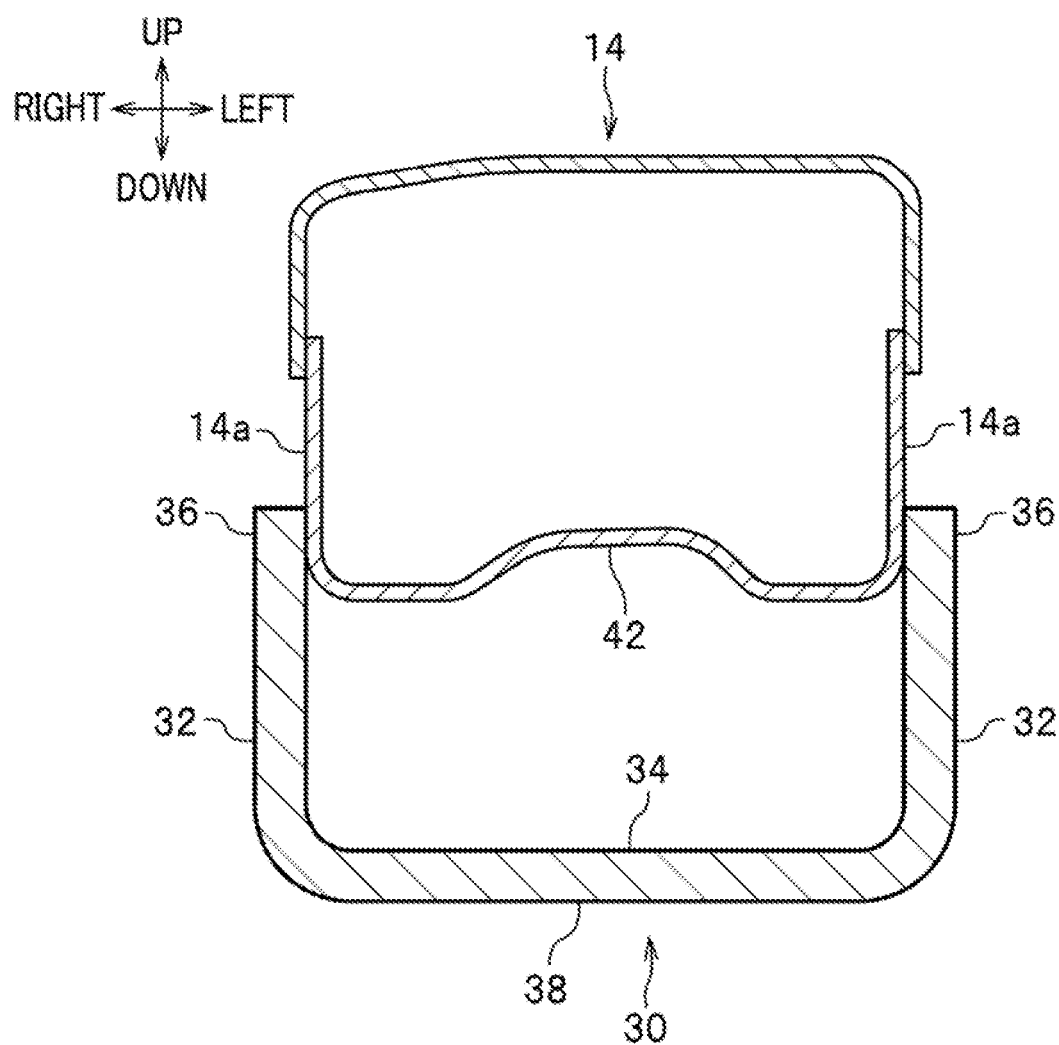
FIG. 4 is a cross-sectional view taken along line IV-IV in FIG. 3.

As shown in FIGS. 1 and 4, each U-shaped bracket 30 has a left-right pair of side walls 32 that face each other in the vehicle width direction and a laterally extending wall 34 extending in the vehicle width direction and connecting between lower ends of the left-right pair of side walls 32. The left-right pair of side walls 32 include a left-right pair of connection portions 36 located at an upper end side of the left-right pair of side walls 32. The left-right pair of connection portions 36 are respectively connected to left and right side faces 14a of the corresponding extension member 14, which are spaced apart in the vehicle width direction (see FIG. 4).

Incidentally, although the laterally extending wall 34 and the left-right pair of side walls 32 of the present embodiment are integrally formed in a single member, they may be formed as separate members and then joined.

The lower face of the laterally extending wall 34 is a bottom face portion that faces the ground plane (ground G). This bottom face portion has a sloped surface 38 that rises upward as the sloped surface 38 extends forward in the vehicle front-rear direction (see FIG. 2). The laterally extending wall 34 has a rear end in which an engagement notch 40 is formed. The engagement notch 40 has a substantially arc shape in bottom view (see FIGS. 1 and 3).

Each side wall 32 has a width dimension along the vehicle front-rear direction. The width dimension increases as the side wall 32 extends from the lower end side thereof contiguous with the laterally extending wall 34 toward the connection portion 36 at the upper end side. As seen in FIG. 2, the width dimension W1 at the upper end side of the side wall 32 is larger than the width dimension W2 at the lower end side of the side wall 32, i.e., W1>W2.

As shown in FIG. 2, the lowermost end of the U-shaped bracket 30 is located at a higher position than the lowermost end of the subframe 10. The dashed line B in FIG. 2 is a line extending in the horizontal direction through the lowermost end of the subframe 10. This dashed line B is at a position lower than the lowermost end of the U-shaped bracket 30.

As shown in FIG. 4, a lower face of each extension member 14 has a depressed portion 42 depressed upward in the vicinity of a portion of the extension member 14 to which the U-shaped bracket 30 is attached, between the left and right pair of connection portions 36.

The front subframe 10, to which the subframe structure according to the present embodiment is applied, is basically structured as described above. Next, a description will be given of the operational effects of the present embodiment.

Each U-shaped bracket 30 of the present embodiment is made from a flat plate and disposed to extend downward and inclined forward in the vehicle front-rear direction. With this structure of the present embodiment, the driver can be informed of presence of an obstacle, such as a curbstone or the like, by a contact sound generated by a contact of the U-shaped bracket 30 with the obstacle prior to the subframe 10 getting in contact with the obstacle. As a result, the present embodiment can prevent the deformation of the subframe 10 and the deformation of the power plant P and can restrain deformation of the U-shaped bracket 30 in the event of contact.

According to the present embodiment, each U-shaped bracket 30 is connected to the left and right side faces 14a of the corresponding extension member 14 via the connection portions 36. This structure can cause the U-shaped bracket 30 itself to fall off from the left and right side faces 14a of the extension member 14 when a large load (shearing load) is applied by an excessive contact with an obstacle, thereby restraining the deformation of the subframe 10.

Moreover, each U-shaped bracket 30 of the present embodiment has the bottom face portion with the sloped surface 38. This sloped surface 38 is sloped such that the sloped surface 38 rises upward as it extends forward in the vehicle front-rear direction. With this structure of the present embodiment, it is possible to cause the sloped surface 38 of the U-shaped bracket 30 to glide over an obstacle in the event of contact with the obstacle, thereby mitigating the impact of the initial contact with the obstacle and restraining the damage of the U-shaped bracket 30 itself.

Moreover, according to the present embodiment, each U-shaped bracket 30 is disposed such that the lowermost end of the U-shaped bracket 30 is located at a higher position than the lowermost end of the subframe 10. This structure can restrain the damage of the U-shaped bracket 30 due to the contact with an obstacle and prevent the falling off of the U-shaped bracket 30 due to the contact with the obstacle.

Moreover, the side walls 32 of the U-shaped bracket 30 of the present embodiment each have a cross-sectional area that increases as the side walls 32 extend toward their connection portions 36 at the upper end side (see W1>W2 in FIG. 2). This structure increases the connection strength of the connection portions 36 and thereby ensures the towing strength during towing. This structure also makes it possible to transmit the load applied to the U-shaped bracket 30 in the event of slight contact with an obstacle to the corresponding extension member 14 of the subframe 10, thereby restraining the damage of the U-shaped bracket 30 itself.

Moreover, according to the present embodiment, the lower face of each extension member 14 has the depressed portion 42 in the vicinity of a portion of the extension member 14 to which the corresponding U-shaped bracket 30 is attached. This structure provides a space for accommodating an engagement hook to be engaged with the U-shaped bracket 30 and facilitates attachment of the engagement hook. Moreover, the depressed portion 42 of the present embodiment forms vertical cross sections and thus serves as a bead. This structure enhances the rigidity and strength of the subframe 10 against a load applied thereto in the vehicle front-rear direction, and thus the deformation of the subframe 10 in the event of contact with a slope or obstacle can be prevented.

Moreover, the laterally extending wall 34 of the present embodiment has a rear end portion in which the engagement notch 40 is formed. With this structure, when an engagement hook is engaged with the laterally extending wall 34 of the U-shaped bracket 30, the engagement hook is stably engaged by the guiding function of the engagement notch 40. It should be noted that the laterally extending wall 34 of the present embodiment has a predetermined length in the vehicle width direction. This structure is advantageous in that two engagement hooks can be engaged with the laterally extending wall 34.

Moreover, each of the left-right pair of extension members 14 of the present embodiment is provided with one U-shaped bracket 30. This structure improves the convenience of towing operations because either or both of the two U-shaped brackets 30 of the left-right pair of extension members 14 can be selected in accordance with the need of the towing operations.

What is claimed is:

1. A subframe structure of a subframe arranged below a power plant room located in a forward part of a vehicle, the subframe comprising:
    a left-right pair of extension members extending in a vehicle front-rear direction and each having a rear end portion;
    a rear member connected to the rear end portions of the pair of left-right extension members and extending in a vehicle width direction; and
    U-shaped brackets each of which is disposed at a front portion of a corresponding one of the left-right pair of extension members, the U-shaped brackets each extending downward and inclined forward in the vehicle front-rear direction in side view,
    wherein each of the left-right pair of extension members has left and right side faces spaced apart in the vehicle width direction,
    wherein each of the U-shaped brackets is made from a flat plate and includes a left-right pair of connection portions respectively connected to the left and right side faces of the corresponding one of the left-right pair of extension members, and
    wherein each of the U-shaped brackets has a bottom face portion having a sloped surface that rises upward as the sloped surface extends forward in the vehicle front-rear direction.

2. The subframe structure according to claim 1,
    wherein each of the U-shaped brackets has a lowermost end located at a higher position than a lowermost end of the subframe.

3. The subframe structure according to claim 1,
    wherein each of the U-shaped brackets includes a left-right pair of side walls respectively including the left-right pair of connection portions, and
    wherein each of the side walls has a width dimension along the vehicle front-rear direction, the width dimension increasing as the side wall extends toward the connection portion thereof.

4. The subframe structure according to claim 1,
    wherein each of the left-right pair of extension members has a lower face with a depressed portion depressed upward between the left-right pair of connection portions.

5. The subframe structure according to claim 3,
    wherein each of the U-shaped brackets has a laterally extending wall extending in the vehicle width direction and connecting between lower ends of the left-right pair of side walls, and
    wherein the laterally extending wall has a rear end in which an engagement notch having a substantially arc shape in bottom view is formed.

6. The subframe structure according to claim 1,
    wherein the U-shaped brackets are respectively attached the left-right pair of extension members.

\* \* \* \* \*